United States Patent [19]
Lai et al.

[11] Patent Number: 4,612,362
[45] Date of Patent: Sep. 16, 1986

[54] THERMOTROPIC POLYESTER-CARBONATES CONTAINING 2,2-DIMETHYL-1,3-PROPANEDIOL

[75] Inventors: Yu-Chin Lai, Whippany; Bruce T. DeBona, Madison; Dusan C. Prevorsek, Morristown, all of N.J.

[73] Assignee: Allied Corporation, Morris Township, N.J.

[21] Appl. No.: 716,312

[22] Filed: Mar. 27, 1985

[51] Int. Cl.[4] .............................................. C08G 63/64
[52] U.S. Cl. .................................... 528/190; 528/176; 528/191; 528/193; 528/194; 528/195; 528/271; 528/298; 528/304; 528/370; 528/371; 528/372
[58] Field of Search ............... 528/190, 176, 191, 193, 528/194, 195, 298, 304, 271, 370–372

[56] References Cited

U.S. PATENT DOCUMENTS

| | | | |
|---|---|---|---|
| 3,772,405 | 11/1973 | Hamb | 528/195 |
| 4,067,849 | 1/1978 | Chang | 528/195 |
| 4,381,358 | 4/1983 | Rosenquist | 528/190 |
| 4,400,491 | 8/1983 | Kafer et al. | 528/191 |
| 4,487,917 | 12/1984 | Mark | 528/195 |

Primary Examiner—Lester L. Lee
Attorney, Agent, or Firm—Richard C. Stewart; Gerhard H. Fuchs

[57] ABSTRACT

A thermotropic polyester carbonate containing aromatic diacyl moieties, aromatic dihydroxy moieties and carbonate moieties, wherein up to 50 mole percent of the aromatic dioxy moieties are replaced with aliphatic dihydroxy moiety, such as 2,2-dimethyl-1,3-propanediol.

17 Claims, No Drawings

THERMOTROPIC POLYESTER-CARBONATES CONTAINING 2,2-DIMETHYL-1,3-PROPANEDIOL

BACKGROUND OF THE INVENTION

1. Field of the Invention

This invention relates to thermotropic aromatic poly(ester carbonates). More particularly, this invention relates to aromatic thermotropic poly(ester carbonates) in which a number of the rigid aromatic moieties have been replaced with 2,2-dialkyl-1,3propanediol moieties.

2. Prior Art

Polymers have known exhibiting liquid crystalline behavior either in solution or in the melt which contribute to desirable properties when formed into either highly ordered fibers or other fabricated structures. The most commonly used class are the aromatic polyamides, typified by poly(p-benzamide), which exhibit liquid crystalline behavior in certain solutions or dopes, and are thus known as lyotropic polymers. An exemplary disclosure of such polymers is U.S. Pat. No. 3,671,542 to Kwolek (June 20, 1972). These polymers are relatively easy to form, but are difficult to handle and must be cast into derived forms (fibers and films) from solution.

Certain aromatic polyesters are known which are liquid crystalline in the melt and are thus thermotropic. U.S. Pat. Nos. 4,140,846 to Jackson, Jr. et al. (Feb. 20, 1979); 3,890,256 to McFarlane et al. (June 17, 1975); 3,991,013 to Pletcher (Nov. 9, 1976); 4,066,620 to Kleinschuster et al. (Jan. 3, 1978); 4,075,262 to Schaefgen (Feb. 21, 1978); 4,118,372 to Schaefgen (Oct. 3, 1978); 4,156,070 to Jackson, Jr. et al. (May 22, 1979) and 4,159,365 to Payet (June 26, 1979) are representative of such thermotropic polyesters. Known polymers of this class must be formed by melt polymerization, and these polymers have not found wide use. These polyesters exhibit little, if any, solubility in most solvents.

One such thermotropic polyester is phenylhydroquinone terephthalate, as described in U.S. Pat. No. 4,159,365 to Payet. While this material has good low temperature properties, the phenylhydroquinone monomer is difficult to prepare and expensive. Furthermore, all of the known thermotropic polyesters lose their good properties at their glass transition temperature which also does not generally exceed 100° C.

Poly(ester carbonates) are a known class of polymers useful in a variety of articles where high performance is desirable. Such polymers are not, however, generally formed into fibers and are not known to exhibit the properties of the aromatic polyamides or other liquid crystalline material of either the lyotropic or thermotropic type. Such poly(ester carbonates) conventionally include as the principal dihydric aromatic alcohol a bisphenol such as bisphenol-A which would be regarded in a nomenclature of B. P. Griffin et al., British Polymer J. 147 (1980), as a nonlinear monomer and include carbonate moieties which are highly flexible. Thermotropic poly(ester carbonates) are described in European Published Patent Application No. 0015856 (Sept. 17, 1980) to Rhone-Poulenc Industries containing methylhydroquinone as the preferred diol (optionally replaced up to 30% by hydroquinone) and various proportions of terephthalate and carbonate. Similarly, U.S. Pat. No. 4,398,018 describes thermotropic poly(ester carbonates) containing diacyl moieties such as terephthalate and carbonate moieties as well as dihydroxy-derived moieties at least 40% of which are derived from t-butylhydroquinone and the remaining dihydroxy-derived moieties being derived from hydroquinone and methylhydroquinone.

While the monomers forming the terephthalate and carbonate moieties are readily available, methylhydroquinone (or its alternates, the chloro, bromo or ethyl compounds) are generally quite expensive. Furthermore, these poly(ester carbonates) have low glass transition temperatures and thus lose good mechanical properties on heating to 100° C.

BRIEF DESCRIPTION OF THE INVENTION

A class of poly(ester carbonates) has been found which can be formed by solution or interfacial techniques, and can also be formed by melt condensation, and which furthermore are thermotropic and thus produce high strength fibers. Because of the combination of solubility and thermotropic behavior, such polymers can be prepared as a solution, cast or spun into fibers either from solution or from the melt and can be oriented or otherwise upgraded by drawing, annealing or other conventional techniques used to improve the orientation and crystallinity of fibers. Furthermore, the thermotropic poly(ester carbonates) of this invention preferably have glass transition temperatures of at least about 80° C., more preferably at least about 100° C., which enables them to retain mechanical properties on heating to these temperatures.

Thus, the present invention relates to an improved poly(ester carbonate) polymer having diacyl moieties which are primarily aroyl and cycloaliphatic moieties, such as terephthaloyl, isophthaloyl, 1,4-cyclohexane dicarbonyl, naphthaloyl and the like, carbonate moieties, and aromatic dihydroxy moieties such as unsubstituted and substituted benzene dioxy moieties, wherein said improvement comprises up to about 50 mole percent of said aromatic dihydroxy moieties replaced by aliphatic dioxy moieties of the formula:

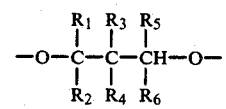

wherein:

$R_1$, $R_2$, $R_5$ and $R_6$ are the same or different and are hydrogen or alkyl; and $R_3$ and $R_4$ are the same or different and are alkyl. The poly(ester carbonates) of the present invention are liquid crystalline in the melt. This is indeed surprising in that it was previously believed that rigid aromatic dioxy monomeric moieties, as for example methylbenzene dioxy, were required for liquid crystallinity characteristics, and that aliphatic dioxy, such as 2,2-dimethylpropane dioxy, would not impart such characteristics.

The polymers of the present invention can be formed as low molecular weight oligomers or polymers of sufficient molecular weight to form fibers. Furthermore, the polymers can be formed interfacially or by solution processes, can be cast or spun into fibers or films either from solution or from the melt and can be drawn and/or annealed.

DETAILED DESCRIPTION OF THE INVENTION

The poly(ester carbonate) polymers of this invention include diacyl moieties, carbonate moieties, cyclic (aromatic and/or cycloaliphatic) dioxy moieties and 1,3-aliphatic dioxy moieties. The carbonate moieties may be formed by conventional means. For example, the carbonate moieties can be derived from phosgene by reacting the phosgene in the formation of the polymer or by exchange of carbonate or haloformate monomers with various oligomers.

The diacyl moieties used in the procedure of this invention can vary widely, provided that it is aromatic diacyl moiety. Useful diacyl moieties are diacylbenzene moieties such as terephthaloyl, isophthaloyl and the like; diacyl naphthalene moieties such as 2,6-diacyl naphthalene and the like; and diacylanthracene such as 9,10-diacylanthracene, and the like; and diacyl cycloaliphatic moieties, as for example 1,4-cyclohexane dicarbonyl, 1,3-cyclohexanedicarbonyl and the like. Preferred diacyl moieties are diacylbenzene moieties and terephthaloyl diacyl moieties are particularly preferred for use.

The diacyl moieties can be formed either from the corresponding diacid, diacid halide or the diester. For example, in the particularly preferred embodiments of this invention in which terephthaloyl is the diacyl moiety of choice, such moiety can be formed from terephthalic acid, or from a terephthaloyl halide such as terephthaloyl chloride, or from terephthalate diesters, such as dimethyl terephthalate or diphenyl terephthalate.

The polymer of this invention includes cyclic and aliphatic dioxy moieties. Such cyclic dioxy moieties can be aromatic or cycloaliphatic. In the preferred embodiments of the invention, the cyclic dioxy moieties of the polymer of the invention are derived from aromatic dihydroxy compounds such as unsubstituted or substituted hydroquinone either alone or in combination with other aromatic dihydroxy compounds. Particularly preferred are substituted hydroquinone monomers either alone or in combination with other aromatic dihydroxy aromatic monomers. Such substituted hydroquinone monomers may be monosubstituted, disubstituted, trisubstituted or tetrasubstituted. If more than one substituent is present, they may be the same or different. Preferred locations for substitution are either monosubstitution, 2,6-disubstitution or trisubstitution. Other disubstitutions are also permissible. In the preferred embodiments, unsubstituted hydroquinone may also be present as a minor component of the aromatic dihydroxy moieties.

The substituents on the other substituted hydroquinone may be alkyl having from about 1 to about 6 carbons, alkoxy having from about 1 to about 6 carbons, phenyl or halo. Of the alkyls, lower alkyls are preferred, and methyl is most preferred. Of the alkoxides, lower alkoxides are preferred and methoxy is most preferred. Of the halos, chloro, bromo and fluoro are preferred over iodo.

Examples of suitable substituted hydroquinone compounds useful in the formation of aromatic dioxy moieties in the present invention are methyl hydroquinone 2,3-dimethyl hydroquinone, 2,5-dimethyl hydroquinone, 2,6-dimethyl hydroquinone, trimethyl hydroquinone, tetramethyl hydroquinone, methoxy hydroquinone, 2,6-dimethoxy hydroquinone, trimethoxy hydroquinone, chloro hydroquinone, 2,6-dichloro hydroquinone, trichloro hydroquinone, bromohydroquinone, 2,6-dibromohydroquinone, tribromohydroquinone, phenylhydroquinone, 2-methyl-6-phenyl-hydroquinone, propylhydroquinone, butylhydroquinone, hexylhydroquinone, fluorohydroquinone and cyclohexylhydroquinone. The predominent dioxy moiety is derived from t-butylhydroquinone monomer.

Other aromatic dihydroxy compounds either alone or in combination with substituted or unsubstituted hydroquinone may be used in the practice of this invention. Such compounds include conventional aromatic dihydroxy compounds used in the preparation of polycarbonates and poly(ester carbonates). Several bisphenols not commonly used in polyesters or polyester carbonates are preferred as the additional dihydric aromatic moieties of the present invention. One such class is the substituted 4,4'-dihydroxy biphenyls. Such dihydroxybiphenyls are preferably substituted in positions adjacent to the hydroxy moieties and are most preferably 3,3',5,5'-tetrasubstituted-4,4'dihydroxy biphenyls. The substituents on the dihydroxybiphenyls may be any of the substituents indicated above for the substituted hydroquinones, but are preferably lower alkyl such as methyl or ethyl, lower alkoxy such as methoxy or ethoxy, or halo such as chloro or bromo.

Other suitable classes of aromatic dihydroxy compounds which may be used alone or together with substituted hydroquinones are the dihydroxynaphthalenes, dihydroxyanthracenes and dihydroxyanthraquinones. Preferred in this group are 2,6-dihydroxynaphthalene, 2,6-dihydroxyanthraquinone and either of which may be substituted with one or more alkyl having from about 1 to about 6 carbons, alkoxy having from about 1 to about 6 carbons, phenyl or halo. 1,5-dihydroxynaphthalene, being substituted benzenedioxy, can be derived from other substituted hydroquinone moieties. The other substituted 1,4-dihydroxyanthraquinone and substituted forms thereof may also be used. Certain linked bisphenols such as 4,4'-dihydroxydiphenyl ether, 4,4'-dihydroxydiphenyl thioether, 4,4'-dihydroxydiphenyl sulfone and substituted forms thereof may also be used. Linked bisphenols with highly flexible linking groups such as isopropylidene (as in bisphenol A) are preferably not used to any significant degree.

Another class of suitable aromatic dihydroxy compounds useful in the practice of the present invention are resorcinol and substituted resorcinols, with substituents as described above for substituted hydroquinones being preferred. Suitable resorcinols include 2-methylresorcinol, 3-methylresorcinol, 2-methoxyresorcinol, 3-methoxyresorcinol, 2,4-dimethylresorcinol, 2-chlororesorcinol, 2-bromoresorcinol 2-propylresorcinol, 2-phenylrecorcinol, 2,4-dichlororesorcinol and the like.

The poly(estercarbonates) of this invention include an aliphatic dioxy moiety of the formula:

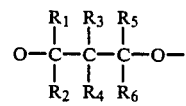

wherein $R_1$, $R_2$, $R_3$, $R_4$, $R_5$ and $R_6$ are as defined above. Illustrative of useful aliphatic dioxy moieties are 2,2-dimethylpropane dioxy; 2-methyl-2-ethylpropanedioxy; 2,2-diethylpropane dioxy; 1,2,2-trimethylpropanedioxy; 1,2,2,3-tetramethylpropanedioxy; 1,1,2,2,3,3-hexamethylpropanedioxy; 2-thyl-2-propylpropanedioxy; 2-methyl-2-t-butylpropanedioxy; 2,2-di-(t-butyl)propanedioxy; 1,3-dimethyl-2,2-diethylpropanedioxy and the like.

Preferred for use in the practice of this invention are aliphatic dioxy moieties of the above-referenced formula in which:

$R_1$, $R_2$, $R_5$ and $R_6$ are the same or different and are hydrogen or alkyl having 1 to about 7 carbon atoms; and $R_3$ and $R_4$ are the same or different and are alkyl having 1 to about 7 carbon atoms.

Particularly preferred for use in the practice of this invention are aliphatic dioxy moieties of the above-referenced formula in which:

$R_1$, $R_2$, $R_5$ and $R_6$ are the same or different and are hydrogen or alkyl having 1 to about 4 carbon atoms; and $R_3$ and $R_4$ are the same or different and are alkyl having 1 to about 4 carbon atoms.

Particularly preferred for use in the practice of this invention are aliphatic dioxy moieties of the above-referenced formula in which:

$R_1$, $R_2$, $R_5$ and $R_6$ are hydrogen; and $R_3$ and $R_4$ are the same or different and are alkyl having from 1 to about 4 carbons.

Especially good results are obtained when 2,2-dimethylpropane dioxy is used.

The proportion of aliphatic dioxy moieties to aromatic dioxy moieties is critical. Heretofore, because of the belief that in thermotropic polymers all monomeric moieties had to be inflexible aromatic groups, it was believed that the use of aliphatic moieties would adversely affect the thermotropic characteristics of the polymer. However, surprisingly, we have discovered that up to about 50 mole percent of the aromatic dioxy moieties can be replaced by the above-referenced aliphatic dioxy moieties without adversely affecting the thermotropic characteristics. In the preferred embodiments of the invention, from about 10 to about 50 mole percent of the dioxy moieties are aliphatic in nature, and in the particularly preferred embodiments, from about 15 to about 45 mole percent of said moieties are aliphatic in nature. Amongst these particularly preferred embodiments, most preferred are those embodiments in which from about 25 to about 40 mole percent of said dioxy moieties are aliphatic in nature.

Where the terephthalate moieties are not the sole diacyl moieties used in the polymer, other aromatic dicarboxylic acid moieties may be used. Examples of such moieties include substituted terephthalates such as methyl-, chloro-, lower alkoxy (one to six carbons) or bromoterephthalate; isophthalate; 2,5-pyridine dicarboxylate; and 2,6-naphthalene dicarboxylate. Substituted forms thereof may also be used as minor components. While the present polymers may have solely carbonate, dihydric aromatic alcohol and diacyl moieties, it is contemplated to include other moieties, including hydroxyaromatic carboxylates such as 4-hydroxybenzoic acid or substituted forms thereof in minor proportions. For example, a polymer of t-butylhydroquinone:terephthalate:carbonate (2:1:1) can be modified by using hydroxybenzoic acid as a fourth component, whereby the ratio becomes, for example, 1.9:0.9:1:0.1 or 1.8:0.8:1:0.2. Hydroxyaromatic carboxylates are used primarily when the polymer is formed by melt condensation, as described below, but may be used in small amounts in the general manner described in U.S. Pat. No. 4,105,633 in solution or interfacial methods. In the latter methods the hydroxyaromatic carboxylate is coupled with phosgene and the resultant diacid converted to a diacyl chloride and then reacted with other monomers including aromatic dihydroxy moieties.

The polymers of the present invention may be formed by solution polymerization. Such techniques involve reacting acid halides, and especially acid chlorides, of the diacyl moieties, e.g. terephthaloyl chloride, and phosgene with the aromatic dihydroxy moieties, including t-butylhydroquinone alone or with or hydroquinones. The reaction is conducted in a solvent, e.g. a chlorinated aliphatic solvent such as dichloromethane, in the presence of an acid acceptor and solvent, e.g. pyridine, and a chain length regulator, e.g. t-butylphenol. The order of addition of reactants is generally not critical.

The poly(ester carbonates) of the present invention may also be formed by interfacial techniques of the type described in U.S. Pat. No. 4,255,556 of L. Segal et al. (Mar. 10, 1981) which describes such processes for polymers similar to those of U.S. Pat. No. 4,156,069 of Prevorsek et al. Care should be taken in the introduction of monomers to minimize the premature precipitation of oligomers in the organic solvent used for the polymerization. In such interfacial polymerizations the aromatic dihydroxy compounds are introduced as a salt in the aqueous phase, e.g. disodium t-butylhydroquinone.

The polymers of the present invention are preferably formed by melt condensation. In this method the diacyl compounds may be introduced as diesters such as diphenylterephthalate and the carbonate moieties as diesters such as diphenylcarbonate. The materials are mixed with the dihydroxy compound (such as t-butylhydroquinone), and optionally a suitable organometallic catalyst such as lithium phenolate, aluminum isopropoxide or sodium methylate, and optionally hydroxybenzoic acid or one of its esters and heated to transesterify and remove the alcohol part of the esters (e.g. phenol) by evaporation.

In a modified melt condensation process, terephthalic acid is used in place of terephthaloyl chloride and the amount of diphenyl carbonate is increased by the molar amount of terephthalic acid (e.g. doubled if the desired final terephthalate: carbonate ratio is 1:1). By heating to the temperature, e.g. 200° C., at which transesterification occurs, the terephthalic acid is converted in situ to diphenyl terephthalate by conversion of the additional diphenyl carbonate to carbon dioxide and water (both of which are vented). The temperature is then raised to a suitable reaction temperature, e.g. 270° C., at which polymerization occurs or is completed, liberating phenol.

Once the polymers are formed, they may be purified, if required, by conventional technology. Thereafter the polymers can be spun or extruded into fibers, sheets or other fabricated forms using conventional techniques, including post-treatments such as drawing, heat treatments and the like. The thermotropic nature of the polymers increases the orientation of the fabricated forms, which manifests itself in improved physical properties, e.g. higher tensile moduli for fibers. In determining liquid crystallinity, conventional procedures can be used. Illustrative of such procedures are the TOT procedures described in cols. 8–10 of U.S. Pat. No. 4,118,372 and cols. 5 and 6 of U.S. Pat. No. 4,075,262.

An important feature of the thermotropic poly(ester carbonate) polymers of the present invention is their retention of properties when heated to 100° C. or above. When formed into oriented fibers or films, the properties most notably retained at elevated temperatures are tenacity and tensile modulus.

The following examples are presented to more particularly illustrate the invention and are not to be construed as limitations therein.

EXAMPLE 1

Into a 2-l kettle connected to an efficient stirrer was charged with 33.0 grams of hydroquinone; 11.0 grams of resorcinol; 41.7 grams of 2,2-dimethyl-1,3-propandiol; 24.8 grams of methylhydroquinone; 175.1 grams of diphenyl terephthalate and 96.6 grams of diphenyl carbonate. In addition to these, therminol 66 (118 grams) and tetrabutyl titanate (3 drops) were also added to serve as heating medium and catalyst respectively. The contents were then heated up under nitrogen and were stirred when temperature reached 200° C. Phenol started to come out as distillate when temperature reached 220° C. The temperature was kept increasing until 300° C., at that time vacuum was applied slowly to reach 2.0 mmHg in 5 minutes. After one hour the reaction stopped. Total weight of phenol and therminol collected was 302 grams. Weight of product was 109 grams. The product showed thermotropic behavior after melt at 240° C. Inherent viscosity in pentafluorophenol at 50° C. was 0.81.

EXAMPLE 2

Into a 2-l kettle connected to an efficient stirrer was charged with 38.5 grams of hydroquinone; 36.5 grams of 2,2-dimethyl-1,3-propendiol; 24.8 grams of methylhydroquinone; 11.0 grams of resorcinol; 175.1 grams of diphenyl terephthalate and 96.6 grams of diphenyl carbonate. In addition to these therminol 66 (120 grams) and tetrabutyl titanate (2 drops) were also added to serve as heating medium and catalyst respectively. The contents were then heated up under nitrogen and stirred when temperature reached 190° C. Phenol started to come out as distillate when temperature reached 220° C. After temperature reached 308° C., vacuum was applied slowly; it reached 0.25 mmHg in 5 minutes. When the temperature reached 310° C., the reaction was stopped and the polymeric product was taken out. Weight of phenol and therminol 66 distilled was 336 grams and weight of polymeric product was 172 grams. The polymer showed liquid crystalline behavior after melted at 260° C. Inherent viscosity in pentafluorophenol at 50° C. was 0.93.

EXAMPLE 3

Into a 2-l kettle equipped with an efficient stirrer was charged with 38.5 grams of hydroquinone; 41.7 grams of 2,2-dimethyl-1,3-propandiol; 18.6 grams of methylhydroquinone and 11.0 grams of resorcinol; 175.1 grams of diphenyl terephthalate and 96.6 grams of diphenyl carbonate. In addition to these, tetrabutyl titanate (2 drops) and therminol 66 (113 grams) were also added. The contents were then heated up and stirred when temperature reached 200° C. After temperature reached 220° C., phenol started to distill out. Vacuum was applied slowly when temperature reached 300° C. and it reached 1.0 mmHg in 5 minutes. After 20 minutes, vacuum became of difficulty in stirring, the reaction was stopped and the polymeric product was taken out. Weight of polymeric product was 180 grams. Weight of phenol and therminol distilled was 317 grams. The polymer showed liquid crystalline behavior after melted at 200° C. It had inherent viscosity of 0.48 in pentafluorophenol at 50° C.

What is claimed is:

1. A poly(ester carbonate) polymer comprising aromatic diacyl moieties, cyclic and aliphatic dioxy moieties and carbonate moieties, from about 10 to about 50 mole percent of said dioxy moieties are aliphatic moieties of the formula:

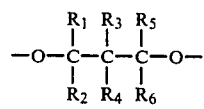

wherein:
$R_1$, $R_2$, $R_5$ and $R_6$ are the same or different and are hydrogen or alkyl; and
$R_3$ and $R_4$ are the same or different and are alkyl; and the remainder of said dioxy moieties are cyclic moieties and said aliphatic and cyclic dioxy moieties in amounts such that said polymer exhibits thermotropic properties.

2. A polymer according to claim 1 wherein:
$R_1$, $R_2$, $R_5$ and $R_6$ are the same or different and are hydrogen or alkyl having from 1 to about 7 carbon atoms; and
$R_3$ and $R_4$ are the same or different and are alkyl having from 1 to about 7 carbon atoms.

3. A polymer according to claim 2 wherein:
$R_1$, $R_2$, $R_5$ and $R_6$ are the same or different and are hydrogen or alkyl having from 1 to about 4 carbon atoms; and
$R_3$ and $R_4$ are the same or different and are alkyl having 1 to about 4 carbon atoms.

4. A polymer according to claim 3 wherein:
$R_1$, $R_2$, $R_5$ and $R_6$ are hydrogen; and
$R_3$ and $R_4$ are the same or different and are alkyl having from 1 to about 4 carbon atoms.

5. A polymer according to claim 4 wherein:
$R_1$, $R_2$, $R_5$ and $R_6$ are hydrogen; and
$R_3$ and $R_4$ are methyl.

6. A polymer according to claim 1 wherein from about 10 to about 50 mole percent of said dioxy moieties are aliphatic.

7. A polymer according to claim 6 wherein from about 15 to about 45 mole percent of said dioxy moieties are aliphatic.

8. A polymer according to claim 7 wherein from about 25 to about 40 mole percent of said dioxy moieties are aliphatic.

9. A polymer according to claim 1 wherein said cyclic dioxy moieties are aromatic.

10. A polymer according to claim 9 wherein all or a portion of said aromatic dioxy moieties are derived from hydroquinone monomer selected from the group consisting of substituted and unsubstituted hydroquinone wherein permissible substituents are selected from the group consisting of halo, alkyl, alkoxy, and phenyl.

11. A polymer according to claim 10 wherein all or a portion of said aromatic dioxy moieties are derived from substituted hydroquinone.

12. A polymer according to claim 1 wherein said aromatic dihydroxy moieties are derived from hydroquinone monomers selected from the group consisting of alkyl substituted hydroquinone.

13. A polymer according to claim 12 wherein said aromatic dihydroxy moieties are derived from t-butylhydroquinone monomer or methylhydroquinone.

14. A polymer according to claim 1 wherein said cyclic moieties are a mixture of aromatic dioxy moieties which includes moieties which are derived from substituted hydroquinone.

15. A polymer according to claim 1 wherein said acyl moieties are selected from the group consisting of terephthaloyl, isophthaloyl, 2,6-diacylnaphthalene, 1,4-cyclohexane dicarbonyl and 1,3-cyclohexane dicarbonyl.

16. A polymer according to claim 15 wherein said acyl moieties are selected from the group consisting of terephthaloyl and isophthaloyl.

17. A polymer according to claim 16 wherein said acyl moieties are terephthaloyl.

* * * * *